Sept. 23, 1958 F. P. MASON ET AL 2,853,543
AUTOMATIC GAIN CONTROL SYSTEM
Filed Jan. 23, 1956
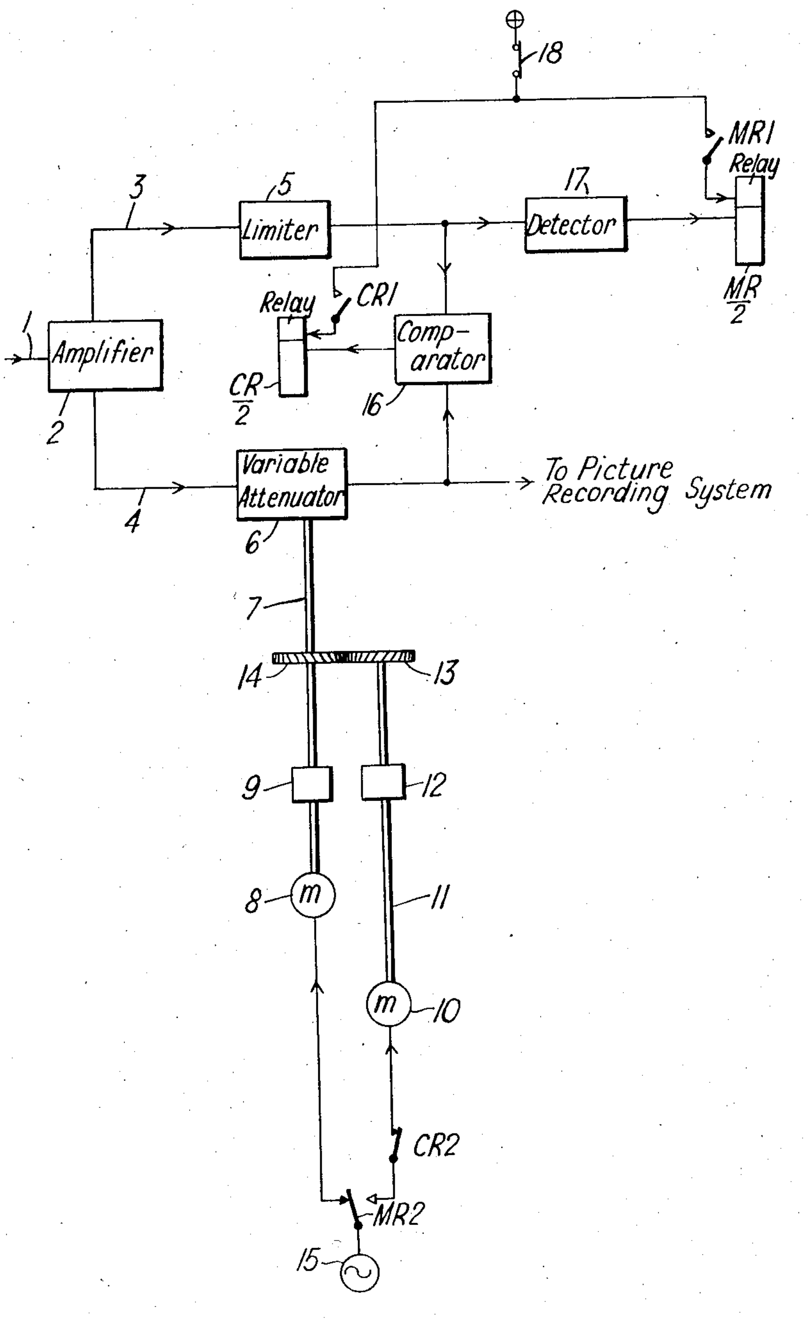
Inventors
F. P. MASON
R. G. STEMP
By [signature]
Attorney United States Patent Office 2,853,543
Patented Sept. 23, 1958

2,853,543

AUTOMATIC GAIN CONTROL SYSTEM

Frederick Percival Mason and Ronald Gilbert Stemp, Croydon, England, assignors to Creed & Company Limited, Croydon, England, a British company Application January 23, 1956, Serial No. 560,836

Claims priority, application Great Britain January 28, 1955

7 Claims. (Cl. 178—5)

The invention relates to an automatic gain control system for use in a facsimile recorder.

Gain control at a recording or receiving point in a facsimile system is necessary because the line losses vary for each transmission, due to change of routing, change of temperature and variation in the signal level. In facsimile systems the recorder will often be unattended and it is then essential that the gain control should be automatic. A special problem then arises, because facsimile picture signals, being heavily amplitude-modulated, do not lend themselves to automatic gain control by orthodox means, since the picture content gives rise to extreme values of mark/space ratio and diverse values of peak amplitude.

One known method of overcoming this difficulty, entailing the transmission of a steady pilot signal accompanying the picture signals, suffers from the disadvantages that such a signal must be outside the picture frequency band and is therefore not a good indicator of picture frequency attenuation, and that it is necessary to provide filters to prevent the pilot signal from interfering with picture recording. Such filters are costly and prone to cause picture distortion.

Another known method is to send a steady signal for alignment purposes for a short period prior to each message. While this is free from the disadvantages outlined above, the period occupied by this signal is a waste of channel time.

It is the object of the present invention to provide an automatic gain control system which does not suffer from any of the disadvantages inherent in the known methods.

According to the present invention there is provided an automatic gain control system for a facsimile recorder in which means is provided to utilise phasing pulses to establish a desired signal level at the recorder.

Prior to the transmission of a facsimile message, it is necessary in all but rare circumstances to transmit a series of phasing pulses which provides the necessary information for establishing the correct phase relationship between the scanning mechanisms of the transmitter and recorder. It is convenient and common for such pulses to be sent by the transmitter to the recorder, and for such pulses to have a repetition rate corresponding to that of the scanning cycle.

Where there is no D. C. path between the transmitter and recorder, such pulses necessarily are modulations of a carrier wave.

It is common and convenient for the recorder to send a signal back to the transmitter to signify that phasing is accomplished and that the transmitter should proceed to scan.

In a two-wire channel, or a channel with two-wire terminations, wherein echo suppressors may be used, there is a delay between the termination of transmission in one direction and the possibility of transmission in the other direction. Therefore, if a series of phasing pulses is sent in one direction, there must be a substantial interval between them to permit of change of direction of transmission to enable the "proceed to scan" signal to be sent to the transmitter. Thus, the possibility of using a nearly continuous carrier, formed into pulses by short punctuations, is excluded.

The phasing pulses are therefore necessarily of short duration separated by long intervals. The use of these pulses to actuate means at the recorder in such a way that the desired signal level is established would give an automatic gain control system without the disadvantages of other arrangements. However, the variations liable to occur in the duration of the pulses has previously prevented their use for this purpose.

The present invention proposes, as a solution to this problem, to cause replicas of the phasing pulses to be sent along two paths at the recorder. One path includes a limiter which limits the pulse amplitude to the desired level. The other path includes means for varying the amplitude of the pulse in that path. Both paths terminate in a common amplitude comparator, which is arranged to deliver an output to a locking relay when the amplitude of the signal in the variable path is equal to or less than that in the limiter path.

In the standby condition the amplitude control means reposes in the condition of minimum attention so that the maximum amplitude of any incoming signal would be passed. Upon the arrival of a series of phasing pulses, a motor is set into operation to drive the amplitude control means in the direction of increasing attenuation so that the amplitude of the signals passed decreases.

As this proceeds, successive pulses will be reproduced with progressively smaller amplitudes in the variable path, and there will eventually be reached a position of the amplitude control means whereat the amplitude of the pulses in the limiter and the variable paths is equal. When this occurs the comparator delivers a pulse to the locking relay, which, having operated and locked up, immediately disables the motor driving the amplitude varying means and so causes the amplitude to remain undisturbed. This condition is maintained until the end of the message.

The invention will be more fully understood from the following description taken in conjunction with the single figure of the accompanying drawing, which shows a block schematic of an automatic gain control system according to the invention.

Referring to the figure of the accompanying drawing, phasing pulses are received over a line 1 and fed to an amplifier 2. The amplifier 2 has two outputs and repeats the pulses over lines 3 and 4 to a limiter 5 and a variable attenuator 6 respectively. The attenuation effected by the attenuator 6 is varied by the shaft 7. Shaft 7 may be rotated either by motor 8 and clutch 9, which serve to reduce the attenuation effected, or by motor 10, shaft 11 and clutch 12 through gears 13 and 14, which cause the attenuation effected by attenuator 6 to be increased. The motors 8 and 10 are selectively energised by power source 15 via contacts MR2 and CR2.

In the stand-by condition the contacts are in the positions shown. The attenuation effected by attenuator 6 has therefore been reduced to a minimum by the operation of motor 8 and clutch 9 on shaft 7, and when the first of a series of phasing pulses is received it will pass the attenuator 6 retaining its maximum amplitude.

The output of the limiter 5 is fed to an amplitude comparator 16 and a detector 17, while the output of the variable attenuator 6 is fed to the picture recording system and to the comparator 16. The comparator 16 is arranged to deliver a D. C. output to its relay CR (which has two contacts) when there is an input from limiter 5 and a concurrent input from attenuator 6 provided that the input from the limiter 5 has an amplitude equal to or greater than that of the input from the variable attenuator 6.

The limiter 5 is arranged to limit the amplitude of the pulses passed by it to a predetermined amount which is that deemed desirable for the picture signals applied to the recording system. The amplification effected by the amplifier 2 is such as to ensure that the received pulses will have an amplitude greater than this, so that the first pulse of a series will not cause the comparator to operate its relay.

The first pulse will, however, be passed from limiter 5 to detector 17 which gives an output capable of operating the motor relay MR (which also has two contacts) associated therewith. Relay MR is thus operated by the first received pulse, and its contacts MR1 and MR2 switch over from the positions shown. The contact MR1 locks up the relay MR and contact MR2 removes the power supply from motor 8 and connects it instead to motor 10. In consequence of this the attenuator 6 is driven slowly towards its maximum attenuation condition.

Eventually the amplitude of the pulses fed from attenuator 6 to comparator 16 and the picture recording system will cease to be greater than the amplitude of the pulses passed from limiter 5. Comparator 16 then delivers a pulse to relay CR which operates and locks up by virtue of the closure of contact CR1. At the same instant the contact CR2 opens and removes the power supply from motor 10, so that further change to the attenuation effected by the attenuator 6 is prevented.

The system thus freezes with the signals delivered by the attenuator 6 standardised in amplitude. By means not shown relay CR also initiates a signal pulse which is sent to the transmitter to cause it to proceed to send the picture. Because of the automatic adjustment which has been effected the picture signals reach the picture recording system at the desired level.

At the end of the message, manual switch 18 is opened by an operator at the recorder, thus removing positive potential from the holding windings of relays MR and CR which both drop off. Their respective contacts then return to the positions shown in the figure, and the power source 15 drives the motor 8. Motor 8, through clutch 9, causes the shaft 7 to rotate in such a direction that the attenuation effected by attenuator 6 is reduced to a minimum again. This condition of minimum attenuation (or maximum gain) continues throughout the stand-by period until the first pulse of the phasing series preceding the next message is received.

Manual switch 18 is only opened momentarily by the operator so that the relays MR and CR will drop off, and then closed so that the relays may be again operated on the receipt of the next series of pulses.

While the principles of the invention have been described above in connection with specific embodiments, and particular modifications thereof, it is to be clearly understood that this description is made only by way of example and not as a limitation on the scope of the invention.

What is claimed is:

1. An automatic gain control system for a facsimile recorder comprising means for receiving phasing pulses, variable attenuating means coupled to said receiving means for attenuating the level of the amplitude of said pulses to the desired level, means for deriving a replica of said pulses, means for limiting the amplitude of said reproduced pulses to the desired level, comparison means for comparing the amplitudes of both sets of said pulses, control means under control of said comparison means to control said attenuating means and means for delivering an output from said comparison means only when the amplitude of the limiter output is equal to or greater than the output from said attenuator.

2. An automatic gain control system for a facsimile recorder comprising an amplifier to amplify received signal pulses having two outputs for signal pulses and replica pulses respectively, a pair of output channels leading from said amplifier, a first one of said channels comprising a limiter, the other of said channels comprising a variable attenuating means, amplitude comparator means disposed between the outputs of said limiter and said attenuating means, respectively, and adjusting means for adjusting said attenuating means under control of an output from said comparator means when the amplitudes of the signal pulses in both said paths are equal.

3. An automatic gain control system as claimed in claim 2, wherein said amplitude comparator means comprises means for delivering an output only when the amplitude of the output signal from said limiter is equal to or greater than the amplitude of the output signal from said variable attenuating means.

4. An automatic gain control system as claimed in claim 2, wherein said adjusting means comprises a pair of motors adapted to adjust said attenuating means to minimum and maximum attenuation, respectively.

5. An automatic gain control system as claimed in claim 4, further comprising a first relay coupled to the output of said first path, respective of said motors adapted to be energised under control of said first relay.

6. An automatic gain control system as claimed in claim 5, further comprising a second relay coupled to the output from said amplitude comparator, and a circuit including both relays for preventing energisation of a first one of said motors and any further change in the attenuation effected by the said attenuating means until the release of one of the said relays.

7. An automatic gain control system for a facsimile recorder comprising a receiver for sets of phasing pulses and replica pulses, said receiver having two output paths connected thereto, a pulse limiter connected to one path and having a branched output for the phasing pulses, a variable attenuator for the replica pulses in the other path, a comparator having separate inputs for comparing the amplitudes of both sets of pulses, a detector connected to the limiter output, means controlled by the output of said comparator for controlling said variable attenuator, and recording means connected to said attenuator.

References Cited in the file of this patent

UNITED STATES PATENTS

| | | |
|---|---|---|
| 1,746,729 | Ives | Feb. 11, 1930 |
| 1,820,335 | Von Bronk | Aug. 25, 1931 |
| 2,506,668 | Haynes | May 9, 1950 |
| 2,545,463 | Hester | Mar. 20, 1951 |